US005696329A

United States Patent [19]

Silverio de Magalhaes Machado et al.

[11] Patent Number: 5,696,329

[45] **Date of Patent: *Dec. 9, 1997**

[54] DIE BOND TOUCH DOWN DETECTOR

[75] Inventors: Ricardo Jorge Silverio de Magalhaes Machado, Rio Tinto; Andre Gil Martins Cardoso, Vila Nova De Gaia, both of Portugal

[73] Assignee: Texas Instruments Incorporated, Dallas, Tex.

[ * ] Notice: The term of this patent shall not extend beyond the expiration date of Pat. No. 5,608,172.

[21] Appl. No.: 713,375

[22] Filed: Sep. 13, 1996

Related U.S. Application Data

[63] Continuation of Ser. No. 405,332, Mar. 16, 1995, Pat. No. 5,608,172.

[51] Int. Cl.$^6$ ........ G01L 1/00

[52] U.S. Cl. ........ 73/862.541

[58] Field of Search ........ 73/862.541, 862.629, 73/862.632, 862.634, 862.637, 862.627, 862.633

[56] References Cited

U.S. PATENT DOCUMENTS

| | | | |
|---|---|---|---|
| 3,738,560 | 6/1973 | Kuliche | 228/10 |
| 3,840,169 | 10/1974 | Steranko | 228/4 |
| 4,040,885 | 8/1977 | Hight et al. | 156/378 |
| 4,181,102 | 1/1980 | Kiuchi | 73/141 A |
| 4,224,744 | 9/1980 | Siegel et al. | 35/13 |
| 4,420,985 | 12/1983 | Raskin | 73/862.633 |
| 4,478,093 | 10/1984 | Valadier | 73/862.65 |
| 4,797,994 | 1/1989 | Michaud et al. | 29/720 |
| 4,854,494 | 8/1989 | Von Raben | 228/102 |

FOREIGN PATENT DOCUMENTS

| | | | |
|---|---|---|---|
| 7149932 | 9/1996 | Japan | 73/862.634 |

*Primary Examiner*—Elizabeth L. Dougherty
*Attorney, Agent, or Firm*—Jacqueline J. Garner; W. James Brady, III; Richard L. Donaldson

[57] ABSTRACT

A die bond touch down detector (20) includes a strain gauge circuit (22) having a plurality of strain gauges (12) formed into a wheatstone bridge configuration. The strain gauges (12) are mounted on a die bond head (10) and measure and detect deformations of the die bond head (10). The strain gauge circuit (22) generates a differential output signal in response to deformations detected by the strain gauges (12). The differential output signal is amplified, filtered, and converted to digital format for processing by a microcontroller (36). The microcontroller (36) performs calibration, display formatting, and touch down signal generation. The die bond touch down detector (20) provides real time monitorization, automatic calibration, and real force applied information for the die bond head (10).

4 Claims, 1 Drawing Sheet

DIE BOND TOUCH DOWN DETECTOR

This is a continuation of application Ser. No. 08/405,332, filed Mar. 16, 1995 and now U.S. Pat. No. 5,608,172.

TECHNICAL FIELD OF THE INVENTION

The present invention relates in general to semiconductor fabrication processes and more particularly to a die bond touch down detector.

BACKGROUND OF THE INVENTION

Close detection of touch down positioning and real force applied on the bond heads of die attach bonders, wire bonders, or other equipment is an important requirement for calibration and real time monitorization of the bond head applied force. Previous die bond systems use piezoelectric sensors that induce a piezoelectric voltage in performing touch down detection. These piezoelectric sensors have limited sensitivity, require temperature compensation, noise producing, and are relatively costly. Typically, Z axis height calibrations have been executed manually, resulting in subjective determinations that cause errors in the die bonding process from one operator to another. Existing die bond systems are of poor quality, costly, have calibrating problems, and translate the position of and not the real force applied to the bond head. The real force applied to the bond head, if determined, is indirectly measured by the difference between the control and the feedback of a galvanometer. Therefore, it is desirable to have a die bond detector that can perform close detection of touch down positioning and determine the real force applied by the bond head during real time monitoring operations.

SUMMARY OF THE INVENTION

From the foregoing, it may be appreciated that a need has arisen for a touch down detector that can perform real time monitorization of the real force applied by a bond head. A need has also arisen for a touch down detector that can perform automatic calibration functions to achieve better performance in the die bonding process.

In accordance with the present invention, a die bond touch down detector and method are provided that substantially eliminate or reduce disadvantages and problems associated with conventional die bonding processes.

According to an embodiment of the present invention, there is provided a die bond touch down detector that includes a die bond head and a plurality of strain gauges in contact with the die bond head. The strain gauges are capable of detecting and processing deformations of the die bond head.

The present invention provides various technical advantages over existing die bonding processes. For example, one technical advantage is in the use of strain gauges to detect deformations on the die bond head. Another technical advantage is in directly detecting the real force applied by the die bond head. Yet another technical advantage is to automatically calibrate the touch down detecting circuitry on the die bond head. Still another technical advantage is in performing real time monitoring of die bond head position and force applied. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
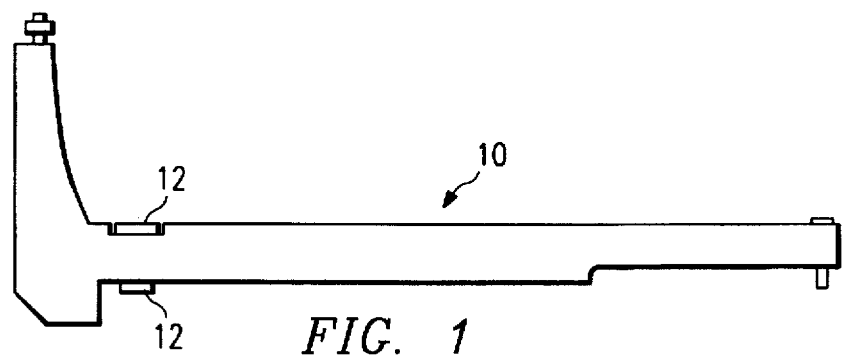
FIG. 1 illustrates a simplified diagram of a die bond head.

FIG. 1 is a diagram of die bond head 10. Attached to die bond head 10 are a plurality of strain gauges 12. Strain gauges 12 are placed at particular points on die bond head 10 in order to precisely measure deformations of die bond head 10 and determine the mechanical stress placed on die bond head 10. Strain gauges 12 are attached to the surface of die bond head 10 and obtain punctual measurements of the deformations of die bond head 10. Strain gauges 12 are passive sensors that convert their own deformations, in response to the deformations of die bond head 10, into resistance variations.

In the embodiment of FIG. 1, four strain gauges are affixed to die bond head 10. Two strain gauges 12 are located in the upper side of die bond head 10 and two strain gauges 12 are located in the lower side of die bond head 10. Four strain gauges 12 are used to increase the sensitivity of the detection system. Strain gauges 12 are fixed at a place on die bond head 10 where there is maximum torque. With this location, accurate detection of die bond head touch down and force can be achieved. Preferable characteristics for strain gauges 12 include a gauge length of 6 millimeters, a gauge resistance of 120 +/−0.3 Ohms, and a gauge factor of 2.13.

Figure 2:
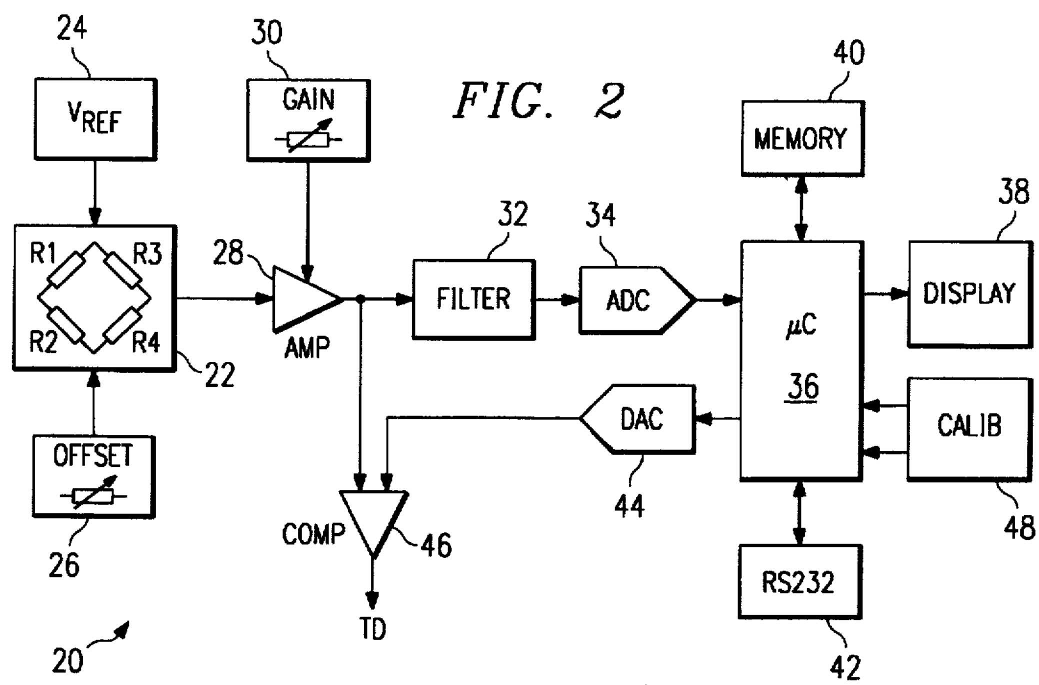
FIG. 2 illustrates a simplified schematic diagram of a die bond touch down detector.

FIG. 2 is a block diagram of a die bond touch down detector 20. Die bond touch down detector 20 includes a strain gauge circuit 22 that can be adjusted and balanced by a voltage reference circuit 24 and an offset circuit 26, respectively. Strain gauge circuit 22 provides an input to an amplifier 28 that is adjusted by a gain circuit 30. The output of amplifier 28 is filtered by filter circuit 32 and converted into digital form by analog-to-digital converter 34. The digital signal from analog-to-digital converter 34 is processed by a microcontroller 36 that drives a display device 38 and performs calibrations in response to parameters retained by a memory 40. Communication between microcontroller 36 and the positioning equipment for die bond head 10 may be performed through an RS232 device 42. Microcontroller 36 also provides a reference value to a digital-to-analog converter 44 in order to generate a touch down detection trigger signal through a comparator 46. A calibration circuit 48 generates the interrupts to microcontroller 36 in order to calibrate the system.

To acquire information from strain gauges 12, a signal conditioner circuit is used. This circuit associates one voltage variation to the resistance variation that is obtained by strain gauges 12 when they are submitted to mechanical stress as applied to die bond head 10. Strain gauge circuit 22 uses a bridge as its signal conditioning circuit. Bridges are double potentiometric circuits with a differential output voltage signal that provides less noise and are less voltage supply drift sensitive than simple potentiometric signal conditioner circuits. Strain gauge circuit 22 uses one complete Wheatstone Bridge configuration. Each bridge arm contains one strain gauge 12 placed in a manner where each half bridge has two strain gauges that have opposite resistance variations. The equivalent resistance variation is also opposite from one half bridge to the other half bridge. The following equations show the relationship between the resistance variations of strain gauges 12 and the output differential voltage of strain gauge circuit 22 with the respective strain gauge deformation.

$$R_1=R+\Delta R=R(1+k\epsilon) \quad (1)$$

$$R_2=R-\Delta R=R(1-k\epsilon) \quad (2)$$

$$R_3=R-\Delta R=R(1-k\epsilon) \quad (3)$$

$$R_4=R+\Delta R=R(1+k\epsilon) \quad (4)$$

$$V_{out}=V_{oc}\left(\frac{R_1}{R_1+R_2}-\frac{R_3}{R_3+R_4}\right)=v_{oc}k\epsilon \quad (5)$$

Voltage reference circuit 24 supplies a stabilized voltage to strain gauge circuit 22. Voltage reference circuit 24 may employ an adjustable precision shunt regulator. The use of a voltage regulator is important because the differential output of strain gauge circuit 22 depends on the voltage supply. Therefore, the output of strain gauge circuit 22 is as accurate as the stability of its voltage supply.

Offset circuit 26 adjusts the balance of strain gauge circuit 22. Offset circuit 26 compensates the deviation of strain gauge circuit 22 when it is at rest. The adjustment provided by offset circuit 26 is performed when strain gauge circuit 22 is at rest until the output differential tension of strain gauge circuit 22 is zero.

The differential output signal of strain gauge circuit 22 is received at amplifier 28. Amplifier 28 is used to amplify the very small differential signals and reject all common mode voltage from the differential output signal of strain gauge circuit 22. The gain of amplifier 28 is adjusted by gain circuit 30. Gain adjustments should agree with system calibrations performed by microcontroller 36.

After amplification, the differential output signal passes through a low pass filter within filter circuit 32. Filter circuit 32 may be a low pass second order Biquad active filter with fs=100 Hertz. Filter circuit 32 eliminates oscillations generated by vibrations of the step motor of the positioning equipment that positions die bond head 10. Filter circuit 32 also eliminates oscillations due to vibrations of arm springs attached to die bond head 10. The filtered output signal is then converted to digital form by analog-to-digital converter 34 in order to be processed by microcontroller 36.

Microcontroller 36 performs all the control functions for die bond touch down detector 20. The basic functions performed by microcontroller 36 are to carry out the mathematical computations to implement a linear regression method for calibration of the system, to transform the analog-to-digital converter values into display values using calibration parameters, and to generate a touch down reference signal to send to the positioning equipment for die bond head 10. The use of microcontroller 36 enables real time control of calibration and filters undesirable noise and accurately detects touch down moment through digital signal processing.

System calibration is performed by microcontroller 36 in response to scale calibration parameters within memory 40. Memory 40 is preferably a non-volatile memory that retains its data when the system shuts down and eliminates the need to calibrate the system each time it is reset.

Microcontroller 36, through display device 38, provides the visualization in the decimal base of the direct output from analog-to-digital converter 34. Display device 38 may be composed of four seven segment displays driven by one display driver.

Microcontroller 36 also generates a reference value in determining touch down detection. The reference value is converted to analog form by digital-to-analog converter 44 and then compared to the output from amplifier 28 in comparator 46. Comparator 46 generates a touch down trigger signal for the positioning equipment of die bond head 10. Comparator 46 is a level detector with a reference tension equal to the output reference of microcontroller 36 of the calibrated scale and with the input voltage connected to the output of instrumentation amplifier 28.

Microcontroller 36 performs a linear regression calibration method that establishes two referential points. These two points are obtained by submitting die bond head 10 to two different weights. The first weight is defined as zero grammes with a die bond head 10 without weight and strain gauge circuit 22 at rest. The second weight is defined as 100% of the scale, meaning that the values displayed are in percentage of the weight defined as 100% of the scale. The linear regression method may be considered as a function specified by the two referential points that transforms input values into pressure, or calibrated force, values.

Figure 3:
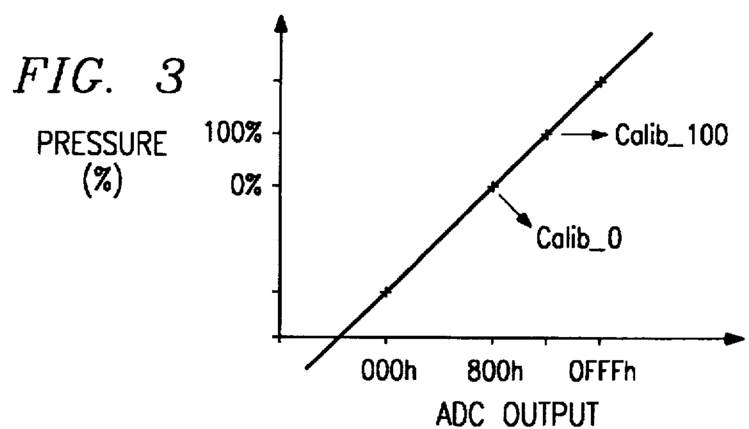
FIG. 3 illustrates a graph of a calibration method performed by the die bond touch down detector.

FIG. 3 shows a graph of the linear regression function line. With this graphic representation, it is easy to conclude that if the gain of amplifier 28 is too high, the 100% calibration point may not be possible with any weight because it may cause the analog-to-digital converter 34 to be out of range. If the gain of amplifier 28 is too low, it may cause a low resolution calibration. These opposing factors should be taken into account to establish the gain of amplifier 28 to obtain the optimum calibration line.

The real time force and touch down information provided by strain gauges 12 and the automatic calibration performed by microcontroller 36 provide an improved bonding process that avoids the temperature compensation techniques of piezoelectric sensors and the subjective manual calibration that induces error between different operators and does not translate the real force applied by the die bond head 10. Die bond touch down detector 20 makes it possible to control the force exerted by die bond head 10 during the bonding process. In this way, the system avoids technical assistance during lot set up due to differences in the die thickness from lot to lot. Die bond touch down detector 20 may also be used for dynamic measuring of damping characteristics of moving parts.

In summary, a die bond touch down detector uses a plurality of strain gauges to measure and detect physical deformations of the geometry of the die bond head upon encountering an obstacle. The die bond touch down detector includes a microcontroller that performs automatic calibration of the positioning equipment in order to accurately detect occurrence of touch down of the die bond head. The die bond touch down detector performs real time monitorization of the real force applied to the die bond head.

Thus, it is apparent that there has been provided, in accordance with the present invention, a die bond touch down detector and method that satisfy the advantages set forth above. Although the preferred embodiment has been described in detail, it should be understood that various changes, substitutions, and alterations can be made herein. For example, though specific connections have been shown, certain circuitry may be coupled together through intermediate circuitry instead of by direct connections as shown in the FIGUREs. Other examples are readily ascertainable by one skilled in the art and can be made without departing from the spirit and scope of the present invention as defined by the following claims.

What is claimed is:

1. A die touch bond detector, comprising a die bond head;

a plurality of strain gauges located on said die bond head, said plurality of strain gauges connected to form a wheatstone bridge, wherein each half of said wheatstone bridge contains at least two of said plurality of strain gauges having opposite resistance variations and the equivalent resistance variation is opposite from one half of said wheatstone bridge to the other half.

2. The die bond touch down detector of claim 1, wherein said plurality of strain gauges perform real time monitoring of said die bond head.

3. The die bond touch down detector of claim 1, wherein said plurality of strain gauges detect real force applied by said die bond head.

4. A die bond touch down detector, comprising:

a die bond head having an upper and lower surface;

a plurality of upper strain gauges located on said upper surface; and a plurality of lower strain gauges located on said lower surface, said pluralities of upper and lower strain gauges connected to form a wheatstone bridge, wherein each half of said wheatstone bridge contains at least one of said upper strain gauges and at least one of said lower strain gauges, and wherein one of said upper strain gauges from one half bridge is connected to one of said lower strain gauges of the other half resulting in opposite equivalent resistance variations between the halves.

* * * * *